2,898,065
OUTRIGGER FISHING POLE SUPPORTS

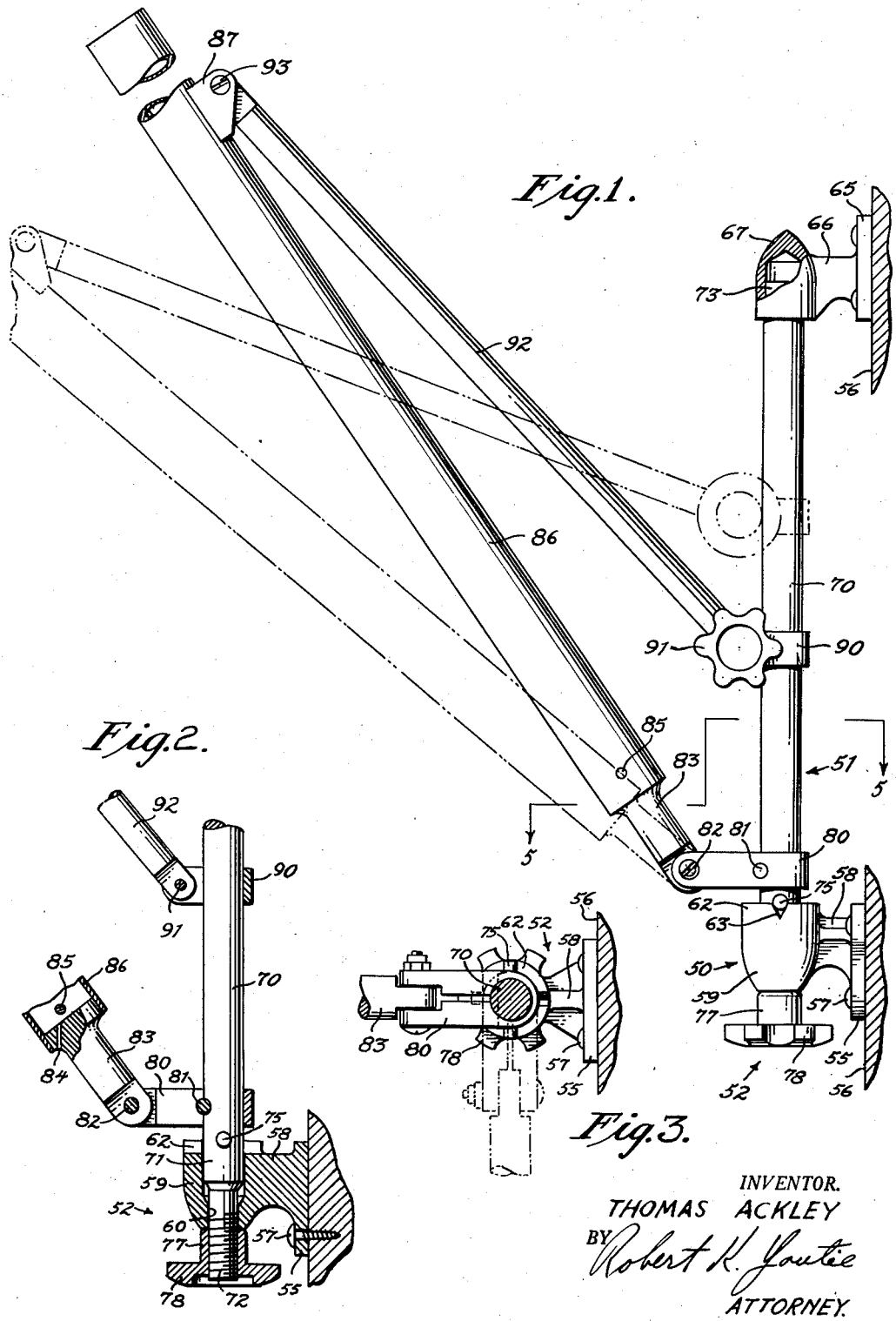

Thomas Ackley, Philadelphia, Pa., assignor to John J. Donovan, Newtown Square, Pa.

Application May 28, 1956, Serial No. 587,587

4 Claims. (Cl. 248—40)

This invention relates generally to fishing appliances, and is particularly directed to a new and improved mount for supporting an outrigger fishing pole.

The particular embodiment of the present invention, which is illustrated in the drawings and which will be described hereinafter in greater detail, comprises generally a supporting bracket, a carrier rotatably received in the bracket, means for locking the carrier against rotation, and pole holding means carried by the carrier.

It is a general object of the present invention to provide an outrigger fishing pole mount of the type described which is extremely simple and durable in construction, and reliable in use, which can be easily installed and maintained, quickly adjusted to any desired position, and is capable of manufacture and sale at a reasonable cost.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claims.

In the drawings:

Figure 1 is a side elevational view showing an embodiment of the outrigger fishing pole mount of the present invention, partly broken away and illustrating an alternate position of pole holder elevation in dot-and-dash outline;

Figure 2 is a partial, sectional elevational view showing the mount of Figure 1 in greater detail; and Figure 3 is a generally horizontal, sectional view taken substantially along the line 5—5 of Figure 1, and illustrating an alternate position of mount rotation in dot-and-dash outline.

Referring now to Figures 1–3, wherein is shown a form of outrigger fishing pole mount, a bracket, generally designated 50, rotatably receives and support a carrier 51, and is provided with retaining means 52 for releasably securing the carrier in any selected position of its rotative movement.

The bracket 50 includes a base member or plate 55 adapted to be fixedly secured in facing engagement with an upstanding or generally vertically disposed supporting surface 56, as by fasteners 57. Projecting outwards from the bracket base 55 is an arm 58, which carries on its outer end an upwardly opening socket member 59. The base 55, arm 58 and socket members 59 are preferably integrally formed. As best seen Figure 2, the upwardly opening socket member 59 also opens downwards, as by a reduced bore 60 extending generally vertically upwards through the lower end of the socket member and into the interior of the latter.

Projecting upwards from the socket member 59, and preferably formed integral therewith, are a plurality of upstanding lugs or locking teeth 62, spaced circumferentially about the socket opening, and defining in the spaces therebetween a plurality of circumferentially spaced, upwardly opening notches which extend generally radially from the socket opening.

Also secured to the supporting surface 56, spaced vertically above the base plate 55, is a base plate 65, from which projects an outstanding arm 66, carrying on its outer end a socket member 67 which opens downwards in substantial vertical alignment with the socket member 59.

The carrier 51 includes a generally vertically disposed elongate member, rod or shank 70 having its lower end portion 71 extending downwards into and rotatably received in the upwardly opening, lower socket member 59, and formed with a reduced, exteriorly threaded lower terminal end portion 72 projecting downwards through the socket member bore 60 and beyond the lower end thereof. The upper end portion 73 of the rod 70 is rotatably received in the downwardly opening, upper socket 67, and normally spaced from the inner end wall of the latter socket.

A cross-piece or locking pin 75 extends transversely through and laterally beyond opposite sides of the rod 70, adjacent to the lower end portion thereof, and is adapted to be selectively and removably seated in a pair of diametrically opposed inter-lug notches 63. More specifically, the cross-piece 75 is fixedly secured by any suitable means in the rod 70, and movable with the latter, so that upward shifting movement of the rod out of its position of Figure 1 will remove the cross-piece from the adjacent, receiving notches 63, and permit the carrier rod 70 to be rotated in the socket members 59 and 67. The pin may thus be positioned adjacent to another diametrically opposed pair of notches 63, and the rod 70 lowered to engage the pin in the adjacent notches, and thereby lock or prevent rotation of the carrier rod, unless the pin 75 is elevated out of its receiving notches 63. Stated otherwise, the carrier rod 70 is mounted in the socket member 59 of the bracket 50 for up and down and rotative movement; and, the socket member lugs 62, and their inter-lug notches 63, combine with the cross-piece 75 to define means for locking the carrier rod in any selected position of its rotation when the carrier rod is moved to its lowermost position with the pin in interengagement with the lugs.

The retaining means 52 includes an annular, internally threaded retaining head or sleeve 77 circumposed about and in threaded engagement with the projecting lower extremity 72 of the carrier rod 70, below the supporting socket member 59. A manually actuable enlargement or knob 78 is provided on the retaining member 77 for rotating the latter upwards toward and downwards away from abutting engagement with the lower end of the supporting socket member. In the illustrated position, the retaining member 77 is in engagement with the lower end of the socket member 59 and serves to hold the carrier rod 70 in its lowermost position within the socket member, with the cross-piece 75 received in notches 63, so that the carrier member is held or retained locked against rotation. However, the retaining member 77 may be rotated on the carrier rod extremity 72 to move the retaining member downwards away from the socket member 59, and thereby permit upward shifting movement of the carrier rod to withdraw the locking pin 75 from between the lugs 62 and rotation of the carrier rod. Obviously, the carrier rod may thus be releasably secured against rotative and up and down movement in any selected position of its rotation.

Non-rotatably embracing the carrier rod 70, slightly above the locking pin 75, is a generally U-shaped member or clevis 80, which is fixed relative to the carrier rod by a transverse pin 81 extending between opposite legs of the clevis and at least partially through the carrier rod.

Pivotally connected between the distal ends of the legs of clevis 80 as by a generally horizontally disposed screw or pivot pin 82 is one end of a plug member 83, best seen in Figure 2. The plug member 83 preferably has its other end, remote from the pin 82, enlarged and provided with a diagonal hole 84.

A tube 86 is arranged axially of and has one end circumposed about and fixedly secured to the enlarged outer end of the plug 83, so that the tube 86 is mounted for swinging movement along with the plug about the horizontal axis of the pin 82. A diametral member or pin 85 may be secured in the tube 86 adjacent to and spaced from the plug 83. Adjacent to the other end of the tube 86, remote from the plug 83, are secured a pair of spaced, outstanding ears 87. As will presently become apparent, the tube 86 is adapted to receive and hold one end of a fishing pole, while the pin 85 in the tubular pole holder provides a stop for the pole, and the through plug hole 84 permits drainage from the pole holder.

A generally U-shaped clamp 90 slidably and rotatably embraces the carrier rod 70 above the clevis 80, and is provided with a manually actuable fastener or screw 91 which extends generally horizontally between the clamp legs to releasably draw the latter together in tight clamping engagement about the carrier rod. Further, the fastener 91 defines a pivot extending between the clamp legs for pivotally supporting one end of a link-type strut 92. More particularly, the strut 92 has one end pivoted to the clamp 90 by the horizontal fastener or pin 91, and has its other end pivotally connected to the pole holder or tube 86 by a generally horizontally disposed pin 93 extending between the ears 87. Thus, the clamp 90 and the adjacent end of the strut 92 may be shifted vertically along and releasably clamped to the carrier rod 70 at any vertical point thereof, which serves to swing the pole holder 86 up and down about the horizontal axis of pin 82, as shown in dot-and-dash outline in Figure 1.

It will now be appreciated that the pole holding tube 86, and a pole received therein, may be swung up and down as desired and secured in any selected position of its up and down swinging movement by release and securement of the clamp 90, while the pole holder and pole may be rotated about the vertical axis of the rod 70 and secured in any position of its rotative movement by release of the nut-like threaded sleeve or retaining member 77 from and securement in its abutting engagement with the lower end of the socket member 59.

From the foregoing, it is seen that the present invention provides a mount for an outrigger fishing pole which fully accomplishes its intended objects, and is well adapted to meet practical conditions of manufacture and use.

Although the present invention has been described in some detail by way of illustration and example for purposes of clarity of understanding, it is understood that certain changes and modifications may be made within the spirit of the invention and scope of the appended claims.

What is claimed is:

1. An outrigger fishing pole mount comprising a base adapted to be fixed to a generally upright supporting surface, an upwardly opening socket member fixed to said base, a plurality of circumferentially spaced lugs projecting upwards from said socket member and defining in the inter-lug spaces a plurality of circumferentially arranged notches, an upstanding rod having its lower end portion received in said socket member for rotative and up and down movement therein, a second socket member adapted to be fixed to said supporting surface directly over and opening downward toward said first-named socket member, said second socket member slidably receiving the upper end of said rod for accommodating said rotative and up-and-down movement of the latter, a cross-piece on said rod and movable therewith for selective engagement in said notches to lock said rod against rotation when in its downward position, a pole holder extending from said rod for rotation therewith and swingable up and down relative thereto, and fastener means arranged below said socket member and in threaded engagement with the lower end portion of said rod for releasably holding the latter in its selected position of rotation.

2. An outrigger fishing pole mount according to claim 1, in combination with a strut having one end pivotally connected to said pole holder and having its other end pivotally and slidably connected to said rod, and means for securing said other strut end against sliding movement relative to said rod.

3. An outrigger fishing pole must comprising a lower upwardly opening socket member adapted to be fixed to an upright supporting surface, an upper downwardly opening socket member adapted to be fixed to said upright supporting surface directly over and spaced from said lower socket member, a generally vertically disposed rod having its lower and upper ends respectively rotatably received in said lower and upper socket members, said rod being of a length capable of limited vertical shifting movement relative to said socket members without withdrawal from the latter, a plurality of circumferentially spaced lugs projecting upward from said lower socket member and defining in the interlug spaces a plurality of circumferentially arranged notches, a crosspiece on said rod adjacent to and exteriorly of said lower socket member and movable with said rod for selective engagement in said notches to lock said rod against rotation when the latter is in its downward position, a reduced externally threaded axial extension on the lower end of said rod projecting downward through and beyond said lower socket member in spaced relation with respect thereto, a retaining member threadedly circumposed about said rod extension and movable thereon into and out of abutting engagement with the underside of said lower socket member for retaining said rod in a selected rotative position with said crosspiece received in selected notches, a lower clevis embracing a lower region of said rod above said crosspiece and fixedly secured to said rod having its legs projecting laterally therefrom, an upper clevis slidably embracing said rod above said lower clevis and having its legs projecting laterally from said rod, a tubular pole holder having one end extending between and pivotally connected to the legs of said lower clevis for swinging movement relative thereto about a generally horizontal axis, a strut having one end extending between the legs of said upper clevis, a generally horizontal threaded fastener extending through the legs of said upper clevis and the strut end therebetween to pivotally connect said strut to said upper clevis and releasably draw said upper-clevis legs for binding engagement of said upper clevis with said rod, and horizontal pivot means pivotally connecting the other end of said strut to said pole holder at a location remote from said one end of the latter.

4. In an outrigger fishing pole mount, the combination comprising a generally vertically disposed rod mounted for axial rotation, holding means connected to said rod for releasably retaining the latter in a selected position of its axial rotation, a lower clevis embracing a lower region of said rod fixedly secured to the latter and having its legs projecting laterally from said rod, an upper clevis slidably embracing said rod above said lower clevis and having its legs projecting laterally from said rod, a tubular pole holder having one end interposed between the legs of said lower clevis, horizontal pivot means extending through the legs of said lower clevis and said one end of said pole holder, a strut having one end extending between the legs of said upper clevis, a threaded fastener extending horizontally through the legs of said upper clevis and said one end of said strut pivotally connecting said strut to said clevis and releasably drawing together the legs of said upper clevis for clamping said upper clevis in binding engagement with said rod, and horizontal pivot means connecting the upper end of said strut to said pole holder at a location remote from said one end of the latter.

References Cited in the file of this patent

UNITED STATES PATENTS

| | | |
|---|---|---|
| 235,106 | Steiner | Dec. 7, 1880 |
| 968,067 | Mowry | Aug. 23, 1910 |
| 1,634,162 | Tesk | June 28, 1927 |
| 2,436,713 | Cody | Feb. 24, 1948 |
| 2,529,148 | Fratt | Nov. 7, 1950 |
| 2,646,240 | Anderson | July 21, 1953 |